United States Patent [19]

Kawai et al.

[11] Patent Number: 4,705,818
[45] Date of Patent: Nov. 10, 1987

[54] POLYPROPYLENE-BASE RESIN COMPOSITION

[75] Inventors: Yoichi Kawai; Masaru Abe; Akio Yoshihara; Shigeru Hayashi; Katsumi Sekiguchi, all of Yokohama, Japan

[73] Assignee: Mitsui Toatsu Chemicals, Incorporated, Tokyo, Japan

[21] Appl. No.: 845,506

[22] Filed: Mar. 28, 1986

[30] Foreign Application Priority Data

Apr. 9, 1985 [JP] Japan .................................. 60-73465

[51] Int. Cl.$^4$ .......................... C08K 9/04; C08K 3/34; C08K 3/26; C08K 3/06
[52] U.S. Cl. .................................. 523/200; 523/212; 523/214; 523/216; 523/217; 524/423; 524/424; 524/426; 524/433; 524/436; 524/437; 524/444; 524/445; 524/451; 524/450; 524/494; 524/505; 525/88; 264/25
[58] Field of Search ............... 524/418, 420, 423, 424, 524/425, 426, 433, 437, 445, 451, 456, 494, 505, 436, 444; 525/88; 523/200, 212, 214, 216, 217

[56] References Cited

U.S. PATENT DOCUMENTS

| 4,087,485 | 5/1978 | Huff | 260/897 |
| 4,088,714 | 5/1978 | Huff | 260/897 |
| 4,220,579 | 9/1980 | Rinehart | 260/33.6 |
| 4,480,065 | 10/1984 | Kawai et al. | 524/456 |
| 4,552,689 | 11/1985 | Yui et al. | 524/528 |

FOREIGN PATENT DOCUMENTS

| 069479 | 6/1982 | European Pat. Off. |
| 0000824 | 2/1985 | World Int. Prop. O. |
| 2134122 | 12/1983 | United Kingdom |
| 2155026 | 8/1984 | United Kingdom |

Primary Examiner—Herbert J. Lilling
Attorney, Agent, or Firm—Fisher, Christen & Sabol

[57] ABSTRACT

Disclosed herein is a polypropylene-base resin composition obtained by heating at a temperature of 170° C.–280° C. a mixture containing a crystalline ethylene-propylene block copolymer having a specific composition, an ethylene-propylene copolymer rubber having a specific composition and viscosity, an inorganic filler having a specific particle size, and an organic peroxide, all in specified amounts. The thus-obtained polypropylene-base resin composition has high molding fluidity and are inexpensive and their moldings have excellent low-temperature impact resistance and paintability along with high stiffness. They are thus suitable for use in the production of large moldings such as automobile bumpers, fenders and body sidemembers.

9 Claims, No Drawings

POLYPROPYLENE-BASE RESIN COMPOSITION

BACKGROUND OF THE INVENTION (1) Field of the Invention:

This invention relates to a polypropylene-base resin composition having excellent low-temperature impact resistance, high molding fluidity, superb paintability and high stiffness.

(2) Description of the Prior Art:

Although polypropylene resins have heretofore been used widely in various fields because of their excellent physical properties such as low specific gravity, high stiffness, and superb chemical and heat resistance, they are accompanied by a drawback in that they have poor impact resistance at low temperatures. With a view toward overcoming this drawback, it has been practiced to use propylene-ethylene copolymers as polypropylene resins or to blend a rubber-like substance, such as an ethylene-propylene copolymer rubber, or polyethylene with polypropylene resins. In addition, it is also commonly practiced to improve their stiffness, heat resistance, dimensional stability, paintability and the like by incorporating a variety of fillers in polypropylene resins.

Given these conditions, it is, however, required for polypropylene resins to fulfill mutually contradictory properties such as high molding fluidity and as moldings, high stiffness, high heat resistance, easy paintability and high impact resistance. Moreover, each of the above properties is required at a high level.

A variety of improvements have been proposed for the above requirements to date. Most of these proposals are, however, insufficient to meet and balance the high degrees of physical properties required. Therefore, it may be required in many instances to add a rubber component, fillers and so on at higher concentrations to polypropylene resins or to apply a special treatment to them, resulting in increased costs. Although subject to the shapes of moldings to be molded, use of such resin compositions may result in moldings having poor external appearance, especially, due to noticeable weld lines, thereby reducing their commercial values. It is therefore strongly desired to make improvements to these drawbacks.

The present inventors have already proposed a process for preparing a polypropylene-base resin composition, which comprises heating at a temperature of 170° C.–280° C. a mixture containing a crystalline ethylene-propylene block copolymer of a specific composition, an ethylene-propylene copolymer rubber of specific composition and viscosity, an inorganic filler of a specific particle size and an organic peroxide, respectively, in specified amounts (see, WO No. 85/00824).

The ethylene-propylene copolymer rubber, which is useful in the practice of the above process, is limited to that having a propylene content of 40–65 wt. % and a Mooney viscosity $ML_{1+4}$ of 15–80 at 100° C.

Although the above-described process is an excellent process, the resultant resin composition gives moldings having poor surface gloss at unpainted parts thereof when it was molded. A still further improvement is therefore desired.

SUMMARY OF THE INVENTION

An object of this invention is to provide an inexpensive polypropylene-base resin composition having high molding fluidity and capable of providing moldings which have excellent low-temperature impact resistance and paintability and high stiffness and surface gloss.

Another object of this invention is to provide a polypropylene-base resin capable of providing moldings having excellent external appearance and especially, containing practically no noticeable weld lines.

A further object of this invention is to provide a polypropylene resin composition suitable for use in the production of large moldings such as automobile bumpers, fenders and body sidemembers.

The present inventors carried out an extensive investigation with a view toward achieving the above objects. As a result, it has been found that use of an ethylene-propylene copolymer rubber having an ethylene content of 10–34 wt. % and a Mooney viscosity $ML_{1+4}$ of 15–80 at 100° C. can also provide moldings not only having similar property balance and paintability to those obtained from the resin composition of the prior application (WO No. 85/00824) but also enjoying excellent surface gloss and external appearance.

The following polypropylene-base resin composition is thus provided by the present invention:

A polypropylene-base resin composition obtained by heating at a temperature of 170° C.–280° C. a mixture containing:

(a) a crystalline ethylene-propylene block copolymer having an ethylene content of 7–30 wt. % and having a portion of 65 wt. % or more insoluble in boiling n-heptane;

(b) an ethylene-propylene copolymer rubber having an ethylene content of 10–34 wt. % and a Mooney viscosity $ML_{1+4}$ of 15–80 at 100° C.;

(c) an inorganic filler having a particle size of 6 μm or smaller; and (d) an organic peroxide, said components (a), (b), (c) and (d) being contained in amounts of 65–95 wt. %, 35–5 wt. %, 2–25 wt. % 0.001–0.5 wt. %, respectively, all based on the total amount of the components (a) and (b).

DETAILED DESCRIPTION OF THE INVENTION

The crystalline ethylene-propylene block copolymer useful in the practice of this invention has an ethylene content of 7–30 wt. % and having a portion of 65 wt. % or more insoluble in boiling n-heptane. If the above ethylene content is less than 7 wt. %, the paintability and impact resistance of the resulting molding are reduced. On the other hand, any ethylene content greater than 30 wt. % reduces the modulus of flexural elasticity of the resulting molding. Thus, it is preferable not to use the crystalline ethylene-propylene block copolymer in any amounts outside the above range.

The ethylene-propylene copolymer rubber, which is useful in the practice of this invention, is limited to that having an ethylene content of 10–34 wt. % and a Mooney viscosity $ML_{1+4}$ of 15–80 at 100° C. If the ethylene content is less than 10 wt. % in the above ethylene-propylene copolymer rubber, the resulting ethylene-propylene copolymer rubber has poor productivity and properties and its handling is difficult, thereby making itself impractical. On the other hand, any ethylene content in excess of 34 wt. % leads to moldings having lowered surface gloss and external appearance (coupled with development of weld lines). Accordingly, it is preferable not to incorporate the ethylene-propylene copolymer rubber in any amounts outside the above-defined range. If an ethylene-propylene copolymer rubber having a Mooney viscosity $ML_{1+4}$ smaller than 15 or greater than 80 at 100° C. is added to the above crystalline ethylene-propylene block copolymer, the particle sizes of the thus-dispersed ethylene-propylene copolymer rubber become excessively small or large and the physical properties of the resulting moldings become imbalanced. Hence, it is preferable not to use ethylene-propylene copolymer rubbers having Mooney viscosities outside the above-defined range.

In the present invention, the ethylene-propylene copolymer rubber is incorporated in an amount of 5–35 wt. % based on the total amount of the crystalline ethylene-propylene block copolymer and the ethylene-propylene copolymer rubber. Any amounts lower than 5 wt. % reduce impact resistance and paintability of the resulting moldings. If the amount of the ethylenepropylene copolymer rubber exceeds 35 wt. %, the molding fluidity of the resulting composition is lowered and the modulus of flexural elasticity of the resulting molding is reduced. Therefore, it is preferable not to incorporate the ethylene-propylene copolymer rubber in any amounts outside the above-defined range.

As illustrative inorganic fillers useful in the practice of this invention, may be mentioned calcium oxide, magnesium oxide, calcium hydroxide, magnesium hydroxide, aluminum hydroxide, magnesium carbonate, calcium carbonate, barium sulfate, talc, clay, glass powder, dolomite, wollastonite, or the like, each having a particle size of 6 $\mu$m or smaller, preferably, 5 $\mu$m or smaller. Use of calcium carbonate, barium sulfate or talc is particularly preferable. These inorganic fillers may be used either singly or in combination.

If one or more of the above inorganic fillers, the particle sizes of which exceed 6 $\mu$m, is used, the resulting polypropylene-base resin composition is reduced not only in impact resistance but also in external appearance.

The term "particle size of inorganic filler" as used herein means Nussenstein's particle size which is determined by the photo-extinction method. As particle size, that corresponding to 50% of the cumulative particle size distribution (generally called "$D_{50}$") may be used.

The proportion of the inorganic filler having a particle size of 6 $\mu$m or smaller to be added in the present invention may range from 2–25 wt. % based on the total amount of the resin components consisting of the crystalline ethylene-propylene block copolymer and the ethylene-propylene copolymer rubber. Any proportions smaller than 2 wt. % are too small to improve stiffness. Stiffness may be further improved to a certain degree as the proportion of the inorganic filler increases beyond 25 wt. %. However, the incorporation of the inorganic filler in any amounts greater than 25 wt. % lowers paintability. Because of the hygroscopicity of the incorporated inorganic filler, in particular, blister may develop between the resin layer and the coating layer, resulting in poor resistance of the coating layer to warm water and moisture and its poor external appearance. Therefore, it is preferable not to add the inorganic filler in any amounts outside the above-defined range.

The inorganic filler useful in the practice of this invention may be surface-treated prior to its use. Its surface treatment may be effected, for example, with any one of various silane-type and titanate-type coupling agents or a surface treatment agent such as that of the higher fatty acid or unsaturated organic acid type.

Application of such a surface treatment is effective in improving such physical properties as kneadability, moldability and processability, self-tapping strength, weld strength and the like, besides the aforementioned advantages of the present invention.

Examples of organic peroxides useful in the practice of this invention include t-butyl peroxypivalate, lauroyl peroxide, benzoyl peroxide, cyclohexanone peroxide, t-butyl peroxyisopropylcarbonate, t-butyl peroxybenzoate, methyl ethyl ketone peroxide, dicumyl peroxide, 2,5-dimethyl-2,5-di(6-butylperoxy)hexane, di-t-butyl peroxide and 2,5-dimethyl-2,5-di(t-butylperoxy)hexyne-3. These organic peroxides may be used either singly or in combination.

The proportion of the organic peroxide may range from 0.001 to 0.5 part by weight, preferably, from 0.01 to 0.3 part by weight based on 100 parts by weight of the total amount of the crystalline ethylene-propylene block copolymer and the ethylene-propylene copolymer rubber. Any amounts smaller than 0.001 part by weight result in resin compositions having small melt flow indexes and hence poor molding fluidity and upon their molding, moldings having more noticeable weld lines and, depending on their shapes, accompanied by flow marks. If the amount of the organic peroxide exceeds 0.5 part by weight on the other hand, the molecular weight of the resin component of the resulting resin composition of this invention becomes too small to render the resin composition suitable for practical applications.

It is also possible to add, either singly or in combination, antioxidants, heat stabilizers, ultraviolet absorbents, fire retardants, nucleating agents, organic or inorganic pigments and the like which are routinely employed in polypropylene resins, so long as their amounts are limited to the extent that they do not impair the advantages of the present invention.

The mixing of the components (a)–(d) in this invention may be carried out using a Henschel mixer or the like commonly employed in the art. Although the heating of the resulting mixture may be effected by a Banbury mixer, a warming-up mill or the like, it is generally desirable to knead the resulting mixture in a molten state and then to form it into pellets by means of a single-screw extruder or a double-screw extruder. In this case, the temperature of the extruder may vary depending on the types and amounts of the crystalline ethylene-propylene block copolymer and the organic peroxide to be used. It is, however, necessary to control it within 170°–280° C. Any temperatures lower than 170° C. are too low to achieve thermal degradation to any sufficient degree, thereby failing to bring about the advantages of this invention to any significant extent.

Even if heat processing is carried out at a temperature higher than 280° C., no significant increase can be observed with respect to the thermal degradation effect. It is undesirable to raise the temperature of the extruder to an excessively high level, because such a high temperature causes the resin composition to undergo thermal decomposition.

The thus-obtained resin composition may be formed into desired moldings in accordance with commonly-employed molding methods, for example, by the injection molding method, the extrusion molding method, the compression molding method, and the like.

The invention will next be described more specifically in the following Examples and Comparative Examples, in which melt flow indexes, moduli of flexural elasticity, Izod impact strength and surface gloss were measured in accordance with ASTM D-1238, ASTM D-790, ASTM D-256 and ASTM D-523, respectively.

EXAMPLE 1

Mixed in a Henschel mixer were 80 parts by weight of a crystalline ethylene-propylene block copolymer (hereinafter called "PP-A") having an ethylene content of 16.5 wt. % and having a portion of 91.5 wt. % insoluble in boiling n-heptane and a melt flow index of 1.5, 20 parts by weight of an ethylene-propylene copolymer rubber having an ethylene content of 25 wt. % and a Mooney viscosity $ML_{1+4}$ of 44.5 at 100° C. (hereinafter referred to as "EPR-A"), 5 parts t,y weight of talc having a particle size of 1.3 μm, 0.13 part by weight of 2,5-dimethyl-2,5-di(t-butylperoxy)hexane and small amounts of other additives shown in Table 1. The resulting mixture was pelletized at 210° C. through an extruder. The thus-obtained pellets were formed into prescribed specimens using an injection-molding machine, followed by measurement of the physical properties of the specimens. Their paintability was evaluated by effecting their coating in accordance with the following two methods. <Coating Method-A>

A two-liquid type priming paint of an acrylic component-chlorinated polypropylene system was coated to a film thickness of 10 μm over each of the specimens obtained using the above injection-molding machine. Thereafter, a two-liquid type top-coating paint of a urethane system was applied to a thickness of about 100 μm over the primed specimens. After drying the thus-primed and top-coated specimens at 90° C. for 40 minutes, they were allowed to stand at room temperature for 48 hours, thereby obtaining specimens (Specimens A) useful in a paintability test. <Coating Method-B>

After subjecting each of specimens of the same type as those used in Coating Method-A to a plasma treatment under the below-described conditions, a two-liquid type top-coating urethane paint was applied to a thickness of about 100 μm. The thus-painted specimens were dried at 90° C. for 40 minutes and then allowed to stand at room temperature for 48 hours, thereby obtaining specimens (Specimen B) useful in a paintability test.

| Conditions for Plasma Treatment | |
|---|---|
| (1) Apparatus: | Microwave plasma treatment apparatus (Model: TMZ-2026M; manufactured by Toshiba Corporation). |
| (2) Treatment atmosphere: | Oxygen. |
| (3) Treatment time: | 30 seconds. |
| (4) Gas pressure: | 1.0 Torr. |
| (5) Gas flow rate: | 480 cc/min. |
| (6) Microwave output power: | 1500 W. |

Cuts were then formed at a distance of 1.0 cm by a cutter in Specimen-A and Specimen-B. The 180° peeling strength of each coating was measured by means of an Instron tensile testing machine. Furthermore, these coated specimens were dipped in warm water of 40° C. and the quality of the coatings were visually observed 240 hours later in accordance with the following standard:
O: No blister in coating.
Δ: Some blister in coating.
X: Considerable blister in coating.

The melt flow index of the thus-obtained polypropylene-base resin and the modulus of flexural elasticity, Izod impact strength, surface gloss, weld line and paintability evaluation results of the specimen are shown in Table 1.

The evaluation of weld line was effected in the following manner.

A portion of the above-described pellets was injection-molded at a molding temperature of 220° C., injection pressure of 800 kg/cm² and mold temperature of 50° C. by a 100-ton injection molding machine into a plate-like specimen of 80×240×2 mm. The specimen had a hole having a diameter of 20 mm, the center of which was located at a point 80 mm apart from a gate portion on one of the 80 mm long ends and 40 mm remote from one of the 240 mm long sides. The weld line occurred in the lengthwise direction from the hole was visually observed in accordance with the following evaluation standard:
O: Weld line was practically invisible.
Δ: Weld line was slightly observed.
X: Weld line was observed considerably.

EXAMPLES 2 and 3

The procedures of Example 1 were repeated except that talc was added in amounts of 2 parts by weight and 10 parts by weight, respectively, for Examples 2 and 3. Test results are given in Table 1.

COMPARATIVE EXAMPLE 1

The procedures of Example 1 were followed except for the omission of talc. Test results are given also in Table 1.

COMPARATIVE EXAMPLE 2

The procedures of Example 1 were followed except that the talc was added in an amount of 30 parts by weight. Test results are shown in Table 1.

COMPARATIVE EXAMPLE b 3

The procedures of Example 1 were repeated except that talc having a particle size of 7.0 μm was used in lieu of the talc having the particle size of 1.3 μm. Test results are shown in Table 1.

EXAMPLES 4 and 5

The procedures of Example 1 were repeated except that barium sulfate having a particle size of 1.2 μm and calcium carbonate having a particle size of 1.9 μm, respectively, for Examples 4 and 5, were used as inorganic fillers in place of the talc having the particle size of 1.3 μm. Test results are given also in Table 1.

EXAMPLE 6

The procedures of Example 1 were followed except that PP-A and EPR-A were used in amounts of 70 parts by weight and 30 parts by weight, respectively. Test results are shown in Table 1.

EXAMPLE 7

The procedures of Example 1 were followed except that a crystalline ethylene-propylene block copolymer having an ethylene content of 6.6 wt. % and having a portion of 92.8 wt. % insoluble in boiling n-heptane and a melt flow index of 3.8 (hereinafter referred to as "PP-B") was used instead of PP-A and that the organic peroxide was added in an amount of 0.03 part by weight. Test results are shown in Table 1.

EXAMPLE 8

The procedures of Example 1 were followed except that, in place of EPR-A, an ethylene-propylene copolymer rubber having a propylene content of 26 wt. % and a Mooney viscosity of 24 at 100° C. (hereinafter referred to as "EPR-D"). Test results are shown in Table 1.

TABLE 1

| | Composition* (parts by weight) | | | | | | | |
|---|---|---|---|---|---|---|---|---|
| | PP | | EPR | | Filler | | | Organic |
| | Type | Amount used | Type | Amount used | Type | Particle size (μm) | Amount used | peroxide |
| Comp. Ex. 1 | PP-A | 80 | EPR-A | 20 | Talc | 1.3 | 0 | 0.13 |
| Example 2 | PP-A | 80 | EPR-A | 20 | Talc | 1.3 | 2 | 0.13 |
| Example 1 | PP-A | 80 | EPR-A | 20 | Talc | 1.3 | 5 | 0.13 |
| Example 3 | PP-A | 80 | EPR-A | 20 | Talc | 1.3 | 10 | 0.13 |
| Comp. Ex. 2 | PP-A | 80 | EPR-A | 20 | Talc | 1.3 | 30 | 0.13 |
| Comp. Ex. 3 | PP-A | 80 | EPR-A | 20 | Talc | 7.0 | 5 | 0.13 |
| Example 4 | PP-A | 80 | EPR-A | 20 | $BaSO_4$ | 1.2 | 5 | 0.13 |
| Example 5 | PP-A | 80 | EPR-A | 20 | $CaCO_3$ | 1.9 | 5 | 0.13 |
| Example 6 | PP-A | 70 | EPR-A | 30 | Talc | 1.3 | 5 | 0.13 |
| Example 7 | PP-B | 80 | EPR-A | 20 | Talc | 1.3 | 5 | 0.03 |
| Example 8 | PP-A | 80 | EPR-B | 20 | Talc | 1.3 | 5 | 0.13 |
| Example 9 | PP-A | 80 | EPR-A | 20 | Talc | 1.3 | 5 | 0.2 |
| Comp. Ex. 4 | PP-A | 50 | EPR-A | 50 | Talc | 1.3 | 5 | 0.13 |
| Comp. Ex. 5 | PP-A | 80 | EPR-C | 20 | Talc | 1.3 | 5 | 0.13 |
| Comp. Ex. 6 | PP-A | 80 | EPR-D | 20 | Talc | 1.3 | 5 | 0.13 |

| | Measurement results of physical properties | | | | Evaluation results of paintability | | | | |
|---|---|---|---|---|---|---|---|---|---|
| | MI | Modulus of flexural elasticity | Izod (−30 C; notched) | Gloss | Peeling strength (Kg/cm) Coating method | | Warm water resistance (external appearance) Coating method | | Evaluation results of |
| | g/10 min. | (Kg/cm) | (Kg cm/cm) | (%) | A | B | A | B | weld line |
| Comp. Ex. 1 | 9.5 | 6500 | Unbroken | 82 | 0.88 | 0.85 | O | O | O |
| Example 2 | 9.0 | 8600 | unbroken | 80 | 0.78 | 0.80 | O | O | O |
| Example 1 | 8.8 | 10800 | unbroken | 80 | 0.85 | 0.82 | O | O | O |
| Example 3 | 8.7 | 12000 | 25.3 | 79 | 0.98 | 0.96 | O | O | O |
| Comp. Ex. 2 | 7.9 | 18500 | 7.3 | 63 | 0.32 | 0.28 | X | X | X |
| Comp. Ex. 3 | 8.9 | 8800 | 10.8 | 78 | 0.72 | 0.69 | Δ | Δ | Δ |
| Example 4 | 9.4 | 8900 | unbroken | 82 | 0.78 | 0.75 | O | O | O |
| Example 5 | 9.2 | 9500 | unbroken | 80 | 0.81 | 0.82 | O | O | O |
| Example 6 | 8.4 | 8800 | unbroken | 82 | 1.03 | 1.00 | O | O | O |
| Example 7 | 10.2 | 9800 | unbroken | 79 | 0.80 | 0.81 | O | O | O |
| Example 8 | 8.6 | 10000 | unbroken | 78 | 0.83 | 0.81 | O | O | O |
| Example 9 | 15.8 | 9700 | 35.2 | 83 | 0.85 | 0.83 | O | O | O |
| Comp. Ex. 4 | 5.2 | 4300 | unbroken | 85 | 1.23 | 1.25 | O | O | O |
| Comp. Ex. 5 | 9.2 | 10200 | 31.5 | 65 | 0.78 | 0.80 | O | O | O |
| Comp. Ex. 6 | 9.5 | 9300 | 8.2 | 83 | 0.55 | 0.58 | O | O | X |

*Other additives: 2,6-di-t-butyl-4-methylphenol - 0.05 wt. part; tetrakis[methylene-3-(3,5-di-t-butyl-4-hydroxyphenyl)propionate]methane - 0.1 wt. part; and calcium stearate - 0.1 wt. part.

mer rubber having an ethylene content of 30 wt. % and a Mooney viscosity $ML_{1+4}$ of 72 at 100° C. (hereinafter referred to as "EPR-B") was employed. Test results are given in Table 1.

EXAMPLE 9

The procedures of Example 1 were repeated except that the organic peroxide was added in an amount of 0.2 part by weight. Test results are shown in Table 1.

COMPARATIVE EXAMPLE 4

The procedures of Example 1 were repeated except that PP-A and EPR-A were added in amounts of 50 parts by weight and 50 parts by weight, respectively. Test results are shown in Table 1.

COMPARATIVE EXAMPLE 5

The procedures of Example 1 were repeated except that EPR-A was replaced by an ethylene-propylene copolymer rubber having a propylene content of 55 wt. % and a Mooney viscosity of 27 at 100° C. (hereinafter referred to as "EPR-C"). Test results are shown in Table 1.

COMPARATIVE EXAMPLE 6

The procedures of Example 1 were repeated except that EPR-A was replaced by an ethylene-propylene copolymer rubber having a propylene content of 26 wt. % and a Mooney viscosity of 24 at 100° C. (hereinafter referred to as "EPR-D"). Test results are shown in Table 1.

The polypropylene-base resin compositions of this invention have high molding fluidity and are inexpensive and their moldings have excellent low-temperature impact resistance and paintability and high stiffness. They are thus suitable for use in the production of large moldings such as automobile bumpers, fenders and body sidemembers.

What is claimed is:

1. A polypropylene resin composition obtained by heating at a temperature of 170° to 280° C. a mixture comprising:
    (a) crystalline ethylene-propylend block complymer having an ethylene content of 7 to 30 weight percent and having a portion of 65 weight percent or more insoluble in boiling n-heptain;
    (b) an ethylene-propylene copolymer rubber having an ethylene content of 10 to 34 weight percent and a Mooney viscosity $ML_{1+4}$ of 15 to 80 at 100° C.;
    (c) an inorganic filler having a particle size 6 μm or smaller; and
    (d) an organic peroxide,
said components (a), (b), (c) and (d) being present in amounts of 65 to 95 weight percent, 35 to 5 weight percent, 2 to 25 weight percent and 0.001 to 0.5 weight percent, respectively, all of which are based on the total amount of components (a) and (b).

2. The polypropylene resin composition according to claim 1 wherein the inorganic filler has a particle size of 5μm or smaller.

3. The polypropylene resin composition according to claim 1 wherein the inorganic filler is selected from the group consisting of calcium oxide, magnesium oxide, calcium hydroxide, magnesium hydroxide, aluminum hydroxide, magnesium carbonate, calcium carbonate, barium sulfate, talc, clay, glass powder, dolomite or wollastonite.

4. The polypropylene resin composition according to claim 1 wherein the inorganic filler is selected from the group consisting of calcium carbonate, barium sulfate or talc.

5. The polypropylene resin composition according to claim 1 wherein the organic peroxide is selected from the group consisting of t-butyl peroxypivalate, lauroyl peroxide, benzoyl peroxide, cyclohexanone peroxide, t-butyl peroxyisopropylcarbonate, t-butyl peroxybenzoate, methyl ethyl ketone peroxide, dicumyl peroxide, 2,5-dimethyl-2,5-di(t-butylperoxy)hexane, di-t-butyl peroxide or 2,5-dimethyl-2,5-di(tbutylperoxy)hexyne-3.

6. The polypropylene resin composition according to claim 1 wherein the components (a), (b), (c) and (d) are mixed and then heated to a temperature of 170° to 280° C. for thermal degradation.

7. The polypropylene resin composition according to claim 1 wherein the components (a), (b), (c) and )d) are kneaded in a molten state at a temperature of 170° to 280° C. and then pelletized for thermal degradation.

8. The polypropylene resin composition according to claim 1 wherein the amount of the component (d) is 0.01 to 0.3 weight percent based on the total amount of the components (a) and (b).

9. The polypropylene resin composition according to claim 1 wherein the component (c) has been surface-treated with a surface treatment agent.

* * * * *